US011344046B2

(12) United States Patent
Doelman

(10) Patent No.: US 11,344,046 B2
(45) Date of Patent: May 31, 2022

(54) COMPOSITIONS TO INCREASE MILK FAT PRODUCTION IN LACTATING RUMINANTS AND METHODS USING THE SAME

(71) Applicant: Nutreco Nederland B.V., Boxmeer (NL)

(72) Inventor: John Henry Doelman, Guelph (CA)

(73) Assignee: NUTRECO NEDERLAND B.V., Boxmeer (NL)

( * ) Notice: Subject to any disclaimer, the term of this patent is extended or adjusted under 35 U.S.C. 154(b) by 0 days.

(21) Appl. No.: 15/516,474

(22) PCT Filed: Oct. 9, 2015

(86) PCT No.: PCT/EP2015/073479
§ 371 (c)(1),
(2) Date: Apr. 3, 2017

(87) PCT Pub. No.: WO2016/055651
PCT Pub. Date: Apr. 14, 2016

(65) Prior Publication Data
US 2018/0228182 A1    Aug. 16, 2018

(30) Foreign Application Priority Data

Oct. 10, 2014    (NL) .................................... 2013610

(51) Int. Cl.
| A23K 20/105 | (2016.01) |
| A23K 50/10 | (2016.01) |
| A23K 20/158 | (2016.01) |
| A23K 20/24 | (2016.01) |

(52) U.S. Cl.
CPC .......... *A23K 20/105* (2016.05); *A23K 20/158* (2016.05); *A23K 20/24* (2016.05); *A23K 50/10* (2016.05); *A23V 2002/00* (2013.01); *A23V 2250/04* (2013.01); *A23V 2250/194* (2013.01)

(58) Field of Classification Search
CPC ..... A23K 20/105; A23K 20/158; A23K 20/24
See application file for complete search history.

(56) References Cited

U.S. PATENT DOCUMENTS

| 3,458,625 | A | 7/1969 | Ensor et al. |
| 3,541,204 | A | 11/1970 | Ramsay et al. |
| 3,959,493 | A | 5/1976 | Baalsrud et al. |
| 4,713,245 | A | 12/1987 | Ando et al. |
| 4,808,412 | A | 2/1989 | Smith et al. |
| 4,832,967 | A | 5/1989 | Autant et al. |
| 4,876,097 | A | 10/1989 | Autant et al. |
| 5,227,166 | A | 7/1993 | Ueda et al. |
| 5,496,571 | A * | 3/1996 | Blagdon ................ A23K 40/35 426/2 |
| 7,550,172 | B2 | 6/2009 | Weakley et al. |
| 2004/0156855 | A1 | 8/2004 | Koyama et al. |
| 2008/0015217 | A1 * | 1/2008 | Vazquez-Anon ...... A61K 31/47 514/311 |
| 2013/0196023 | A1 | 8/2013 | Holma |

FOREIGN PATENT DOCUMENTS

| CN | 1689431 A | 11/2005 |
| EP | 479555 A2 | 11/1996 |
| EP | 1230922 A1 | 8/2002 |
| EP | 2274990 A1 | 1/2011 |
| FR | 2880518 A3 | 7/2006 |
| JP | 60168351 A | 8/1985 |
| JP | 61195653 A | 8/1986 |
| JP | 63317053 A | 12/1988 |
| WO | 9608168 A1 | 3/1996 |
| WO | 2006085774 A1 | 8/2006 |
| WO | 2007048369 A1 | 5/2007 |
| WO | 2010108483 A1 | 9/2010 |
| WO | WO-2010/151620 A2 | 12/2010 |
| WO | 2011014069 A2 | 2/2011 |
| WO | 2013133713 A1 | 9/2013 |
| WO | 2016055651 A1 | 4/2016 |

OTHER PUBLICATIONS

Emery et al., Effect of a Modified Sulfite Waste Liquor and of Calcium Gluconate on Milk Production, 1960, J. Dairy Sci. vol. 43: pp. 1643-1647.
PCT International Search Report and Written Opinion, PCT/EP2015/073479, dated Oct. 9, 2015.
PCT International Search Report, PCT/EP2015/073479, dated Oct. 9, 2015.
Ouwerkerk et al. "Enumeration of Megasphaera elsdenii in rumen contents by real-time Taq nuclease assay", Journal of Applied Microbiology 2002, 92, 753-758.
D'Silva et al., "Localization of phytase in Selenomonas ruminantium and Mitsuokella multiacidus by transmission electron microscopy" Can J Microbiol. Apr. 2000;46(4):391-5.
European Extended Search Report for European Application No. 19172822.9, dated Jun. 24, 2019, 2 pages.
Chinese First Office Action for Chinese Application No. 201580054880.3, dated Jan. 6, 2020, 41 pages with translation.
Jayaprakash et al. "Rumen-protected choline: A significance effect on dairy cattle nutrition" Veterinary world vol. 9(8) (2016): 837-41, doi:10.14202/vetworld.2016.837-841.

* cited by examiner

Primary Examiner — Stephanie A Cox
(74) Attorney, Agent, or Firm — Sunit Talapatra; Foley & Lardner LLP

(57) ABSTRACT

Disclosed is a composition comprising a gluconic acid and/or one or more gluconic acid derivatives and a controlled release agent, wherein the controlled release agent allows partial, substantial, or substantially complete ruminal bypass of the composition. The composition may be used as a ruminant feed or feed supplement, particularly for increasing milk fat production in a lactating ruminant, for improving the health status of the hindgut of a ruminant, for increasing the production of butyrate in the hindgut of a ruminant, and/or for increasing somatic growth of a ruminant.

40 Claims, No Drawings

COMPOSITIONS TO INCREASE MILK FAT PRODUCTION IN LACTATING RUMINANTS AND METHODS USING THE SAME

CROSS-REFERENCE TO RELATED APPLICATIONS

This application is a national phase entry under 35 U.S.C. § 371 of International Patent Application PCT/EP2015/073479, filed Oct. 9, 2015, designating the United States of America and published in English as International Patent Publication WO 2016/055651 A1 on Apr. 14, 2016, which claims the benefit under Article 8 of the Patent Cooperation Treaty to Netherlands Patent Application Serial No. 2013610, filed Oct. 10, 2014.

TECHNICAL FIELD

This disclosure is in the field of ruminant feeds or ruminant feed supplements. This disclosure provides a composition comprising gluconic acid and/or derivatives thereof (particularly calcium gluconate and sodium gluconate) and a controlled release agent, which minimizes digestion of the composition in the rumen. Preferably, the controlled release agent allows the release and digestion of the composition in the abomasum and subsequent digestive track (particularly the small intestine) of ruminant animals. Also provided is a method to increase milk fat production in lactating (dairy) ruminants, a method to increase the production of butyrates in the lower intestine of ruminants, as well as a method for making the compositions of the disclosure. The compositions of the disclosure and related methods are particularly suitable to increase milk fat production in lactating ruminants (particularly dairy cows) but also to increase the production of butyric acid and derivatives thereof (particularly butyrates) in the lower intestine of ruminants, and additionally to improve the health status of the lower intestine (particularly small intestine) of ruminants and/or boost somatic growth of ruminants (particularly beef cattle, sheep and goats). Finally, an increase in milk fat production ultimately results in an increase of fat-corrected milk production.

BACKGROUND

Ruminant-derived products, such as dairy products, make up a large portion of the Westernized diet and are increasing in demand. Large research efforts have been dedicated to develop feeds and feed supplements for lactating (dairy) ruminants, but also for other ruminants, which not only promote health and growth of ruminants but also lead to improved quality of ruminant-derived products and cost-effective farming practices.

One area of interest in this respect is the milk industry. Dairy farmers and the dairy industry judge the value or "richness" of milk by its percentage of butterfat (or fat content, also known as the main constituent of butter). The butterfat content of milk is, in fact, a major factor that determines the price of milk in markets; i.e., the more butterfat, the higher the price. Milk with higher fat content is desired by dairy farmers and the dairy industry because it can be diluted prior to trade, a practice that indirectly increases milk production and profits.

Ruminant animals, which belong to the suborder of *Ruminantia* (e.g., cows, beef cattle, goats, sheep, bison, giraffes, yaks, deer, camels, llamas, antelopes, etc.), differ from non-ruminant animals or so-called "monogastric" animals (i.e., organisms having one stomach such as, for instance, swine, humans, cats, dogs, horses, etc.) through their characteristic digestive system, which consists of four compartments referred to as the rumen (first chamber), the reticulum (second chamber), the omasum (third chamber), and the abomasum (fourth chamber). These digestive chambers are endowed with distinctive characteristics (e.g., pH environment, microbiota profile, enzyme profiles, digestive and absorptive processes, etc.).

EP1230922 describes use of hexose-derived acids such as gluconic acid for promoting the fattening of animals, particularly monogastric animals.

WO 2013/133713 is concerned with reducing the incidence of diarrhea in neonatal calves or piglets by including encapsulated glucono delta-lactone (GDL) in calf milk replacers or sow milk replacers. Neonatal calves are not considered ruminants but rather are considered as pre-ruminants, similar to monogastrics such as piglets. In neonatal calves, the rumen is bypassed mechanically due to the so-called esophageal groove. It seems that the encapsulation serves to protect from degradation in the acidic conditions of the stomach (abomasum), and to ensure release in the colon, where it can exert its medical activity.

U.S. Pat. No. 3,959,493 describes rumen bypass products that may be used to protect medicaments or diagnostic agents during their passage through the rumen.

U.S. Pat. No. 7,550,172 discloses a method to increase milk production, including milk fat production, which consists of feeding ruminants with a feed containing high levels of starch in accordance with a feeding regimen consisting of timing the levels of starch intake in relation to dry matter intake. However, such ruminant feed is not optimal since starch detrimentally affects the digestive processes in the rumen, which, in turn, causes a decrease in dry matter intake (i.e., decreasing intake of energy substrates) and lowers (rather than increases) milk production over time.

U.S. Pat. No. 3,458,625 discloses methods and ruminant feeds to improve milk production and to increase butterfat content in milk consisting of feeding lactating ruminants high levels of unsaturated fats. However, the effects on milk fat production and milk production can be attributed to an increased calorie intake derived from a high fat diet.

Other ruminant feeds and ruminant feed supplements dedicated to increasing milk fat production and milk production in general rely on the same concepts or combinations thereof, i.e., ruminant feeds characterized in that they contain high starch content and/or high fat content (see WO 2006/085774, WO 2007/048369, US/20130196023, EP0479555, WO 2010/151620, WO 2010/108483, FR2880518, WO 2011/014069, and many others).

Emery et al., *J. Dairy Sci.* 43:1643-1647 (1960), administered calcium gluconate to low yielding lactating dairy cows. It was observed that calcium gluconate increased fat-corrected milk production, albeit to a very low extent. This publication describes the effects of supplementation with a source of calcium gluconate that was directly available for ruminal fermentation.

It is an object of this disclosure to provide an improved feed or feed supplement for ruminants, particularly adult ruminants, particularly to increase milk fat production in lactating ruminants, to increase ruminant intestinal health, and/or to increase somatic growth in ruminants.

BRIEF SUMMARY

In a first aspect, this disclosure relates to a composition comprising i) a gluconic acid and/or one or more salts thereof and (ii) a controlled release agent, which composition has a ruminal bypass fraction of at least 50%, preferably at least 75%.

The one or more gluconic acid salts may be selected from calcium gluconate, sodium gluconate, quinine gluconate, ferrous gluconate, potassium gluconate, zinc gluconate, copper gluconate, cobalt gluconate, barium gluconate, lithium gluconate, magnesium gluconate and cupric gluconate; preferably is calcium gluconate and/or sodium gluconate, more preferably is calcium gluconate.

In an embodiment, the controlled release agent has an intestinal digestibility fraction of at least 50%, preferably at least 75%.

The controlled release agent may be selected from the group consisting of fatty acids, animal oils, vegetable oils and mixtures thereof. The controlled release agent may be a vegetable oil. The vegetable oil may be selected from palm oil, soybean oil, rapeseed oil, cottonseed oil, castor oil, or any combination thereof.

In an embodiment, the vegetable oil is soybean oil.

The vegetable oil may be partly hydrogenated, preferably fully hydrogenated.

In an embodiment, the controlled release agent comprises hydrogenated forms of vegetable oil.

In an embodiment, the weight percent ratio of the gluconic acid and/or one or more salts thereof to the controlled release agent as taught herein may range from about 20:80 to about 65:35 percent by weight, or may be at least about 40:60 percent by weight, preferably 50:50 percent by weight.

In an embodiment, the gluconic acid and/or one or more salts thereof is released post-ruminally, preferably in the abomasum and/or small intestine of a ruminant.

In a second aspect, this disclosure relates to a method for producing the composition as taught herein comprising:
forming a matrix comprising gluconic acid and/or one or more gluconic acid and/or one or more salts thereof and a controlled release agent.

In an embodiment, the gluconic acid and/or one or more salts thereof of the composition as taught herein may be calcium gluconate.

In an embodiment, the controlled release agent may comprise hydrogenated forms of vegetable oil.

In an embodiment, the composition as taught herein may be used as a ruminant feed and/or ruminant feed supplement.

The composition as taught herein may be used for increasing milk fat production in a lactating ruminant.

Alternatively or additionally, the composition as taught herein may be used for improving the health status of the hindgut of a ruminant.

The ruminant feed composition as taught herein may also be used for increasing the production of butyrate in the hindgut of a ruminant.

Alternatively or additionally, the composition as taught herein may be used for increasing somatic growth of a ruminant.

The ruminant may be selected from the group consisting of dairy cows, beef cattle, sheep, goats, bison, buffalo, moose, elks, giraffes, yaks, deer, camels, and antelope, and is preferably selected from dairy cows, sheep and goats.

The ruminant referred to herein may be an adult ruminant.

The disclosure also relates to a method for increasing milk fat production in a lactating ruminant comprising the step of administering to the ruminant a composition comprising i) a gluconic acid and/or one or more gluconic acid derivatives, and ii) a controlled release agent, which composition has a ruminal bypass fraction of at least 50%, preferably at least 75%. The composition may be administered in an amount ranging from about 0.01 gram per day to about 1000 grams per day. The gluconic acid and/or one or more gluconic acid derivatives may be calcium gluconate. The composition may be administered orally.

In an embodiment, the ruminant is adult.

The ruminant may be selected from the group consisting of cows, cattle, sheep, goats, bison, buffalo, moose, elks, giraffes, yaks, deer, camels, and antelope, preferably cows.

The disclosure also relates to the use of a composition comprising i) a gluconic acid and/or one or more gluconic acid derivatives and ii) a controlled release agent, which composition has a ruminal bypass fraction of at least 50%, preferably at least 75%, as a ruminant feed and/or ruminant feed supplement; and/or use of such composition for increasing milk fat production in a lactating ruminant; and/or use of such composition for improving the health status of the hindgut of a ruminant; and/or use of such composition for increasing the production of butyrate in the hindgut intestine of a ruminant; and/or use of such composition for increasing somatic growth of a ruminant.

The ruminant may be an adult ruminant.

The ruminant may be selected from the group consisting of dairy cows, beef cattle, sheep, goats, bison, buffalo, moose, elks, giraffes, yaks, deer, camels, and antelope, and is preferably selected from dairy cows, sheep and goats.

General Definitions

In the following description and examples, a number of terms are used. In order to provide a clear and consistent understanding of the specification and claims, including the scope to be given to such terms, the following definitions are provided. Unless otherwise defined herein, all technical and scientific terms used have the same meaning as commonly understood by one of ordinary skill in the art to which this disclosure belongs. The disclosures of all publications, patent applications, patents and other references are incorporated herein in their entirety by reference.

The term "gluconic acid," as used herein, refers to an organic compound with molecular formula $C_6H_{12}O_7$ and condensed structural formula $HOCH_2(CHOH)_4COOH$. It is one of the 16 stereoisomers of 2,3,4,5,6-pentahydroxyhexanoic acid. The term "gluconic acid derivative(s)," as used herein, refers to compound(s) derived from gluconic acid and includes gluconate salts and gluconate esters. The term "gluconate salts," as used herein, refers to any salts derived from gluconic acid. The salts of gluconic acids are also known as "gluconates." Non-limiting examples of gluconate salts include calcium gluconate, sodium gluconate, ferrous gluconate, potassium gluconate, zinc gluconate, copper gluconate, cobalt gluconate, barium gluconate, lithium gluconate, magnesium gluconate, manganese gluconate, cupric gluconate, and the like. Non-limiting examples of gluconate esters include gluconic acid cyclic ester with boric acid, quinine gluconate, glucono-delta-lactone, and the like.

The term "short-chain fatty acids" (abbreviated as SCFAs), as used herein, refers to a sub-group of fatty acids with aliphatic tails of up to six carbons, including formic acid, lactic acid, acetic acid, propionic acid, isobutyric acid (2-methylpropanoic acid), butyric acid, isovaleric acid (3-methylbutanoic acid), valeric acid (pentanoic acid), and the like. SCFAs are produced when dietary fibers are fermented in the lower intestine of mammals. Specifically, SCFA production in the lower intestine of ruminants is the result of fermentation of dietary carbohydrate.

The term "butyric acid" (also known under the systematic name butanoic acid), as used herein, refers to a carboxylic acid with the structural formula $CH_3CH_2CH_2COOH$. The term "butyric acid and derivatives," as used herein, refers to compounds derived from butyric acid and includes salts and esters of butyric acid, which are known as butyrates or butanoates. Non-limiting examples of butyrate salts include sodium butyrate, calcium butyrate, magnesium butyrate, manganese butyrate, cobalt butyrate, barium butyrate, lithium butyrate, zinc butyrate, potassium butyrate, ferrous butyrate, and the like. Non-limiting examples of butyrates (i.e., esters of butyric acid) include cellulose acetate butyrate, methyl butyrate, ethyl butyrate, butyl butyrate, pentyl butyrate, and the like.

The term "ruminants" or "ruminant animals," as used herein, refers to mammals that are able to acquire nutrients from plant-based food through fermentation in a specialized stomach chamber prior to digestion, principally through bacterial actions. The process typically requires regurgitation of fermented ingesta (known as cud), and chewing it again. The process of rechewing the cud to further break down plant matter and stimulate digestion is called "rumination." The primary difference between ruminant animals and non-ruminant animals is that ruminant animals have a four-chambered stomach.

Most of the fermentation of feed material takes place in the rumen. The rumen is populated by several phyla of microorganisms, which result in fermentation of feedstuffs. In the reticulum, similar fermentation functions are carried out. The rumen and reticulum are often referred to as the "reticulorumen," which essentially consists of a "fermentation chamber" containing micro-organisms that convert plant carbohydrate to volatile fatty acids (mainly acetate, propionate and butyrate), lactate, carbon dioxide, methane and hydrogen. The omasum serves as a gateway for the abomasum allowing absorption of volatile fatty acids and water to reduce the volume of digesta reaching the abomasum. The abomasum is often referred to as the direct equivalent of the monogastric stomach, and is often called the "true stomach" due to its ability to digest and degrade feed materials in an acidic and enzymatic environment. Material digested in the abomasum (also called "digesta") transits into the small intestine, where the further digestion and absorption of nutrients occurs.

Non-limiting examples of ruminants include bovine animals such as dairy cattle, beef cattle, sheep, goats, buffalo, moose, elks, bison, giraffes, yak, deer, camels, antelopes, and the like.

The term "bovine animals" or "bovine," as used herein, refers to a variety of bovine animals including cows, bulls, heifers, steers, stags, does, bucks, oxen, calves, and the like.

The term "lactating ruminant," as used herein, refers to a ruminant animal that is capable of producing milk post-parturition.

The term "dairy ruminant," as used herein, refers to a ruminant animal, whose milk is used for commercial purposes.

The term "ruminal bypass" or "rumen bypass" refers to a partial or complete "escape" of digestion or degradation by microorganisms populating the rumen. To bypass the rumen of ruminants, one may use a so-called "controlled release agent" (also often referred to as "ruminal bypass agent" or "protective agent"). The term "controlled release agent," as used herein, refers to any compounds, composition, or mixture of compounds or compositions capable of controlling the release of one or more ingredients (e.g., an active compound such as a gluconate salt). The controlled release agent comprised in the composition taught herein allows the active ingredient(s) to substantially bypass the rumen while, preferably, allowing the active ingredient(s) to be substantially digested and/or substantially absorbed in the lower intestine of ruminants (i.e., small intestine). In other words, the controlled release agents employed in the compositions taught herein are preferably characterized in that they substantially allow bypass of the rumen and are substantially degraded in the abomasum and/or subsequent regions of the digestive tract (lower intestine, particularly) of ruminant animals.

A variety of suitable controlled release agents are available. Controlled release agents rely on various modes of action. For instance, certain controlled release agents are substantially un-degradable in the rumen of ruminant animals, e.g., because microorganisms in the rumen lack the enzyme profile required to degrade or digest them or endogenous enzymes are not present or in insufficient quantities to initiate degradation. In the abomasum and subsequent digestive track of ruminants (lower intestine), the necessary enzymes to degrade and digest such compounds are present, resulting in degradation or digestion of the controlled release agents in these gastrointestinal compartments. Representative, non-limiting examples, of such type of controlled release agents include compositions comprising or consisting essentially of fatty acids, animal oils, vegetable oils, waxes, soaps, chelating agents, and other compounds.

Other controlled release agents consist of controlled release agents that are "pH sensitive," i.e., are substantially stable (not degraded or digested) in pH environments that are characteristic of the rumen (i.e., pH between 6.0 and 7.0) but are substantially degraded (i.e., broken down) in pH environments that are characteristic of the abomasum and subsequent digestive tract of ruminants (i.e., pH between 2 and 4). Representative, non-limiting examples of such type of controlled release agents include liposomes, membranes, hydrogels, aldehyde, acrylic polymers or co-polymers, polysaccharides, vinyl polymers or copolymers, amino acids, and mixtures thereof.

Other controlled release agents, as well as other ways or methods to bypass the rumen of ruminants that are different than those described above, may also be used in the present disclosure. The skilled person knows how to select and prepare a controlled release agent that is suitable for use in this disclosure.

The term "ruminal bypass fraction" or "rumen bypass rate," as used herein, refers to the fraction, i.e., percentage, of active substance (e.g., calcium gluconate) that bypasses the rumen, e.g., escapes digestion or degradation by microorganisms populating the rumen, i.e., that is still present upon exiting the rumen. The ruminal bypass fraction can be measured by any conventional methods known. The skilled person is well acquainted with such methods and is able to select a suitable method to measure the ruminal bypass fraction of a ruminant feed or feed supplement composition. For instance, one may use the method described in Sakker et al., *Anim. Feed Sci. and Tech.* 185:133-139 (2013), wherein the method described consists of a dual liquid phase marker technique to measure stability of rumen-protected nutrients encapsulated in a fat coating. Rumen-protected nutrients were manufactured to contain cobalt-EDTA and pulse dosed in the rumen concomitant with an equal weight of chromium EDTA, which was pulse dosed in the rumen as free chromium EDTA. Rumen fluid samples were collected prior to dosing and thereafter every 2 hours until 25 hours post-dosing and then every 4 hours until 49 hours post-dosing. Rumen fluid samples for cobalt and chromium analysis were in duplicate using a Varian SpectrAA Atomic Absorption Spectrophotometer. Area under the curve from ruminal in vivo clearance of cobalt (delivered as cobalt-EDTA) relative to the clearance of chromium (delivered as chromium EDTA) was used to determine the rumen instability of the rumen-protected nutrients.

The term "intestinal digestibility fraction," as used herein, refers to the percentage of active substance (e.g., calcium gluconate) that has bypassed the rumen and that is subsequently digested in the abomasum and subsequent intestinal tract. The intestinal digestibility fraction may be measured by any conventional methods that are suited for this purpose. The skilled person is well acquainted with such methods and is able to select one that is suitable to measure the intestinal digestibility fraction of a ruminant feed or feed supplement composition. For instance, one may use an in vitro method consisting of exposing (for 3 hours at 39° C.) the sample recovered from the ruminal bypass experiment as described above to a buffer that mimics the fluid of the abomasum. Recipes and methods to make suitable buffers, which mimic the fluid of the abomasum are available. For instance, one such buffer is the so-called Clark-Lubs buffer, which can be made by dissolving the following reagents in 1000 ml of water: 3.73 grams of potassium chloride and 2.1 ml of hydrochloric acid. At the term of the experiment, the total amount (%) of active substances (i.e., gluconate salt) dissolved in the buffer may be analyzed and the percentage of digestibility in the abomasum is then calculated.

To measure the intestinal digestibility fraction in the further or subsequent digestive tract of ruminants (i.e., lower intestine, particularly the small intestine), one may, for instance, use an in vitro method consisting of exposing (for 24 hours at 39° C.) the sample recovered from the abomasum digestibility experiment as described above to a buffer that mimics the fluid of the small intestine. Digesta from the small intestine can be collected via duodenal cannula from which fluid can be extracted for use in in vitro incubations. At the term of the experiment, the total amount of active substances (e.g., calcium gluconate) dissolved in the buffer is analyzed and the percentage of digestibility in the further or subsequent digestive tract of ruminants (i.e., lower intestine, particularly the small intestine) is then calculated.

The term "butter fat," "butterfat," "milkfat," or "milk fat," as used herein, refers to the fatty portion of milk. Typically, the composition of fats in milk is discussed in terms of the fatty acids encompassed, including saturated fatty acids (such as palmitic acid, myristic acid, stearic acid, pentadecanoic acid, and heptadecanoic acid) and unsaturated fatty acids (such as oleic acid, palmitoleic acid, linoleic acid, and linolenic acid). However, fatty acids do not occur as such in milk, but are incorporated into compounds called triglycerides. The amount of butterfat in milk and the fatty acid composition of such butterfat may vary according to the producing animal's diet or may vary according to the different breeds of cattle (e.g., Jersey cows are renowned for high percentage of butter fat). Dairy farmers judge the "richness" of milk by its percentage of butterfat. The butterfat content is the main factor that determines the price of milk. "Butter fat" is also known as the main constituent of butter.

The term "milk fat yield," as used herein, refers to the amount by weight of milk fat that is expressed from the mammary glands into milk harvested from the lactating dairy ruminant on a daily basis. It is typically quantified in terms of g/day or kg/day.

The term "milk fat concentration," as used herein, refers to the amount of milk fat yield as a percentage of total milk yield, i.e., the proportion of milk fat, by weight, in milk.

The term "lower intestine" or "hind gut," as used herein, refers to the post-abomasum part of the digestive tract of ruminants and includes the small intestine and its subsections (i.e., duodenum, jejunum, and ileum), as well as the cecum and the large intestine and its subsections (i.e., colon and rectum).

The term "about," as used herein, indicates a range of normal tolerance in the art, for example, within two standard deviations of the mean. The term "about" can be understood as encompassing values that deviate at most 10%, 9%, 8%, 7%, 6%, 5%, 4%, 3%, 2%, 1%, 0.5%, 0.1%, 0.05%, or 0.01% of the indicated value.

The terms "comprising" or "to comprise" and their conjugations, as used herein, refer to a situation wherein the terms are used in their non-limiting sense to mean that items following the word are included, but items not specifically mentioned are not excluded. It also encompasses the more limiting verb "to consist essentially of" and "to consist of."

Reference to an element by the indefinite article "a" or "an" does not exclude the possibility that more than one of the elements is present, unless the context clearly requires that there be one and only one of the elements. The indefinite article "a" or "an" thus usually means "at least one."

The terms "to increase" and "increased level" and the terms "to decrease" and "decreased level" refer to the ability to significantly increase or significantly decrease or to a significantly increased level or a significantly decreased level. Generally, a level in a test sample is increased or decreased when it is at least 5%, such as 10%, 15%, 20%, 25%, 30%, 35%, 40%, 45%, 50% higher or lower, respectively, than the corresponding level in a control sample or reference sample. Alternatively, a level in a test sample may be increased or decreased when it is statistically significantly increased or decreased. In an embodiment of this disclosure, the control sample or reference sample is from a lactating ruminant not fed with the ruminant feed or feed supplement composition taught herein, preferably of the same genus and/or species as the test lactating ruminant.

DETAILED DESCRIPTION

Compositions

It was surprisingly found that the release of a composition comprising gluconic acid and/or one or more gluconic acid derivatives (e.g., one or more salts thereof, such as calcium gluconate) to the abomasum and the lower intestine of ruminants, thereby bypassing the rumen, resulted in an increase in milk fat production in lactating ruminants.

Without wishing to be bound by any theory, it is believed that the increased production of milk fat is due to alterations in the amounts and ratio of small chain fatty acid (SCFA) produced through hindgut fermentation in the abomasum and lower intestine provided by the gluconic acid and/or gluconate precursor. Changes in SCFA yield facilitate increased milk fatty acid precursor and increased butyrate to promote beneficial changes in the hindgut, including lower intestine, of ruminants resulting in increased milk fat production as well as increased somatic growth in ruminants. It is also believed that the butyrate improves the health status of the hindgut, including lower intestine, of ruminants.

In a first aspect, this disclosure relates to a composition comprising gluconic acid and/or one or more gluconic acid derivatives, and a controlled release agent, wherein the controlled release agent allows partial, substantial or substantially complete ruminal bypass of the composition.

In a preferred embodiment, the controlled release agent allows a substantially complete ruminal bypass of the composition.

In one embodiment, the composition comprising the gluconic acid and/or one or more derivatives thereof, and the controlled release agent, may be used as constituent of a ruminant feed or feed supplement composition. Alternatively, the compositions as taught herein may be used as a feed supplement composition per se.

In one embodiment, the composition comprises one or more suitable gluconic acid derivatives selected from gluconic acid salts and gluconic acid esters. For instance, the composition may comprise one or more gluconate salts or esters selected from calcium gluconate, sodium gluconate, ferrous gluconate, potassium gluconate, zinc gluconate, copper gluconate, cobalt gluconate, barium gluconate, lithium gluconate, cupric gluconate, magnesium gluconate, manganese gluconate, and/or one or more gluconate ester selected from gluconic acid cyclic ester with boric acid, quinine gluconate, glucono-delta-lactone, and the like.

In one embodiment, the composition taught herein comprises calcium gluconate and/or sodium gluconate, preferably calcium gluconate.

The gluconic acid and/or one or more gluconic acid derivatives may be incorporated in a matrix of the controlled release agent, or may form a core that is coated with the controlled release agent. The compositions as taught herein may also be referred to as a controlled release composition. The compositions as taught herein may be administered to a ruminant per se, or may be administered in admixture with other ingredients. For example, the composition as taught herein may be incorporated into a feed composition or a feed supplement composition.

When preparing a ruminant feed or feed supplement composition comprising the controlled release composition as taught herein, it may be advantageous (although not essential) to add other ingredient(s). For instance, one or more ingredients selected from binding substances (e.g., cellulose derivatives such as hydroxypropylcellulose, methyl cellulose, sodium carboxymethylcellulose, vinyl derivatives such as polyvinyl alcohol or polyvinylpyrrolidone, gum arabic, guaiac gum, sodium polyacrylate, and the like), filling substances (e.g., starch, proteins, crystalline cellulose, and the like), inert ingredients (e.g., silica and silicate compounds), flow-control substances that help the formation of pellets (wheat middlings, beet pulp, and the like), preservative agents (propionic acid or its salt, sorbic acid or its salt, benzoic acid or its salt, dehydroacetic acid or its salt, parahydroxybenzoic acid esters, imazalil, thiabendazole, orthophenyl phenol, sodium orthophenylphenol, diphenyl, and others compounds and mixtures thereof), antibacterial agent, and other compounds, may be added to prepare the ruminant feed or feed supplement compositions as taught herein. The skilled person is familiar with techniques and compounds that are useful to achieve these purposes and that are compatible with the production of the ruminant feed or feed supplement compositions taught herein.

It may also be advantageous (but not essential) to further enhance the nutritional value and/or the therapeutic value of the compositions as taught herein by adding further feed ingredients (e.g., nutritional ingredients, veterinary or medicinal agents, etc.) or other ingredients to the compositions as taught herein.

For instance, one or more ingredients selected from grain products, plant products, animal products, proteins (e.g., protein ingredients as obtained from sources such as dried blood or meat meal, meat and bone meal, cottonseed meal, soybean meal, rapeseed meal, sunflower seed meal, canola meal, safflower meal, dehydrated alfalfa, corn gluten meal, soybean protein concentrate, potato protein, dried and sterilized animal and poultry manure, fish meal, fish and poultry protein isolates, crab protein concentrate, hydrolyzed protein feather meal, poultry byproduct meal, liquid or powdered egg, milk whey, egg albumen, casein, fish solubles, cell cream, brewer's residues, and the like), amino acids, enzymes, probiotic microorganisms, prebiotic ingredients, mineral salts, vitamins (e.g., thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like), sugars and complex carbohydrates (e.g., water-soluble and water-insoluble monosaccharides, disaccharides, and polysaccharides), veterinary compounds (e.g., promazine hydrochloride, chloromedoniate acetate, chlorotetracycline, sulfamethazine, monensin, sodium monensin, poloxaline, oxytetracycline, BOVATEC, and the like), antioxidants (e.g., butylated hydroxyanisole, butylated hydroxytoluene, tertiary-butylhydroquinone, tocopherols, propyl gallate and ethoxyquin), trace element ingredients (e.g., compounds of cobalt, copper, manganese, iron, zinc, tin, nickel, chromium, molybdenum, iodine, chlorine, silicon, vanadium, selenium, calcium, magnesium, sodium and potassium, and the like), and other compounds or ingredients, may be added to the ruminant feed or feed supplement compositions as taught herein.

The skilled person is familiar with methods and ingredients that are suitable to enhance the nutritional and/or therapeutic/medicinal value of ruminant feeds and feed supplements, and knows how to enhance the nutritional and/or therapeutic/medicinal value of the composition taught herein.

Any controlled release agent that allows at least partial, preferably substantial or substantially complete ruminal bypass may be used in the compositions as taught herein. "Substantial ruminal bypass," as used herein, refers to ruminal bypass fractions of over 50%, such as over 55%, 60%, 65%, 70%, or 75% or more. "Substantially complete ruminal bypass," as used herein, refers to ruminal bypass fractions of over 80%, 85%, 90%, 95% or more. Controlled release agents that allow partial, substantial, or substantially complete ruminal bypass in ruminants as well as methods to produce and use them for the purpose of partially or completely bypassing the rumen are well known and commercially available. The skilled person knows how to prepare an effective controlled release agent that allows partial, substantial, or substantially complete ruminal bypass that is suitable for the delivery of gluconic acid and/or one or more gluconic acid derivatives (e.g., calcium gluconate) to the abomasum and lower intestine of ruminants.

In an embodiment of the disclosure, the controlled release agent additionally allows at least partial, preferably substantial, more preferably substantially, complete intestinal digestibility. "Substantial intestinal digestibility," as used herein, refers to intestinal digestibility fractions of over 50%, such as over 55%, 60%, 65%, 70%, 75% or more. "Substantially complete intestinal digestibility," as used herein, refers to intestinal digestibility fractions of over 80%, 85%, 90%, such as over 95% or more.

Non-limiting representative examples of controlled release agents endowed with partial, substantial, or substantially complete ruminal bypass capacity include compositions comprising fatty acids (e.g., saturated or unsaturated fatty acid, essential fatty acids, short-chain fatty acids, medium-chain fatty acids, long-chain fatty acids, very-long-chain fatty acids or mixtures thereof), compositions comprising partly or fully hydrogenated (or hardened) animal oils (beef tallow, yellow grease, sheep tallow, hog fat and others or mixtures thereof), and compositions comprising partly or fully hydrogenated (or hardened) vegetable oils (e.g., palm oil, soybean oil, rapeseed oil, cottonseed oil, castor oil, and others or mixtures thereof), and compositions comprising a mixture of two or more ingredients selected from fatty acids, partly or fully hydrogenated (or hardened) animal oils, and partly or fully hydrogenated (or hardened) vegetable oils, and other compounds.

Non-limiting examples of controlled release agents endowed with partial or substantially complete ruminal bypass capacity are described, for instance, in U.S. Pat. Nos. 3,541,204, 3,959,493, 5,496,571, JP 60-168351, JP 61-195653, JP 63-317053, patent application WO 96/08168, and others.

Other non-limiting examples of controlled release agents endowed with partial, substantial or substantially complete ruminal bypass capacity include controlled release agents that are sensitive to pH, i.e., will break down depending on the pH environment. Ruminal bypass compositions belonging to this category are chosen because they are partially, substantially or substantially completely stable or insoluble in pH environment of the rumen (pH environment ranging between 5.5 and 7.0) and partially, substantially or completely soluble in pH environment of the abomasum (pH environment ranging from 2 to 4). Representative, non-limiting examples of pH-sensitive controlled release agents endowed with partial, substantial or substantially complete ruminal bypass capacity include liposomes, membranes, hydrogels, acrylic polymers or co-polymers, polysaccharides, vinyl polymers or copolymers, amino acids, and mixtures thereof. Examples of ruminal bypasses that are at least partially, preferably substantially or substantially completely sensitive to pH environment are described, for instance, in U.S. Pat. Nos. 4,713,245, 4,808,412, 4,832,967, 4,876,097, and 5,227,166.

In an embodiment, the controlled release agent may be coated onto the gluconic acid and/or one or more gluconic acid derivatives. In another embodiment, the gluconic acid and/or gluconic acid derivatives may be incorporated or encapsulated into a matrix composed of a controlled release agent as taught herein.

In an embodiment, the controlled release agent has a ruminal bypass fraction ranging from about 1% to about 100%, or is preferably at least about 50%, preferably at least about 80%, more preferably at least about 90%. For instance, it may be advantageous to use a controlled release agent that has a rumen bypass fraction of at least about 50%, preferably at least about 60%, preferably at least about 70%, preferably at least about 75%, preferably at least about 80%, preferably at least about 85%, preferably at least about 90%, preferably at least about 95%, or more.

In an embodiment, the controlled release agent has a post-ruminal release fraction ranging from about 1% to about 100%, or is preferably at least about 50%, preferably at least about 80%, more preferably at least about 90%. For instance, in an embodiment, it may be advantageous to use a controlled release agent that has a post-ruminal release fraction of at least about 50%, preferably at least about 60%, preferably at least about 70%, preferably at least about 75%, preferably at least about 80%, preferably at least about 85%, preferably at least about 90%, preferably at least about 95%, or more.

In an embodiment, it may be advantageous to use a controlled release agent that has an intestinal digestibility fraction ranging from about 1% to about 100%, or is preferably at least about 50%, preferably at least about 80%, more preferably at least about 90%. For instance, in an embodiment, it may be advantageous to use a controlled release agent that has an intestinal digestibility fraction of at least about 50%, preferably at least about 60%, preferably at least about 70%, preferably at least about 75%, preferably at least about 80%, preferably at least about 85%, preferably at least about 90%, preferably at least about 95%, or more.

In another embodiment, it may be advantageous to use a controlled release agent that has a ruminal bypass fraction ranging from about 1% to about 100%, or is preferably at least about 50%, preferably at least about 80%, more preferably at least about 90%, and that also has an intestinal digestibility fraction ranging from about 1% to about 100%, or is preferably at least about 50%, preferably at least about 80%, more preferably at least about 90%.

For instance, it may be advantageous to use a controlled release agent that has a ruminal bypass fraction of at least 50%, preferably at least about 60%, preferably at least about 70%, preferably at least about 75%, preferably at least about 80%, preferably at least about 85%, preferably at least about 90%, preferably at least about 95%, or more, and that also has an intestinal digestibility fraction of at least about 50%, preferably at least about 60%, preferably at least about 70%, preferably at least about 75%, preferably at least about 80%, preferably at least about 85%, preferably at least about 90%, preferably at least about 95%, or more.

When preparing the composition taught herein, it may be advantageous (although not essential) to add one or more ingredients to the controlled release agent. Representative, non-limiting examples of such ingredients include lecithin, waxes (e.g., carnauba wax, beeswax, natural waxes, synthetic waxes, paraffin waxes, and the like), fatty acid esters, magnesium carbonate, calcium carbonate, calcium phosphate, calcium pyrophosphate, calcium hydrogen phosphate hydrates, calcium hydrogen phosphate dihydrate, calcium dihydrogen pyrophosphate, magnesium pyrophosphate, magnesium hydrogen phosphate hydrates, aluminium phosphate, magnesium hydroxide, aluminium hydroxide, manganese oxide, zinc oxide, sodium hydrogen carbonate, and ferric oxide, and mixtures thereof, and others. The addition of one or more of such ingredients may be beneficial to further facilitate ruminal bypass and/or to facilitate the release and/or the digestion and/or the degradation, in the abomasum and lower intestine, of the gluconic acid and/or derivatives thereof. The skilled person knows how to select suitable ingredients to achieve this purpose.

In an embodiment, it may be advantageous to use a controlled release agent that is, at least partially, preferably substantially completely insensitive to lipolysis and biohydrogenation in the rumen of ruminants, i.e., that is not partially or completely digested or degraded by the microorganisms inhabiting the rumen. Suitable (non-limiting) examples of controlled release agents having such properties include fatty acids (e.g., saturated or unsaturated fatty acid, essential fatty acids, short-chain fatty acids, medium-chain fatty acids, long-chain fatty acids, very-long-chain fatty acids, or mixtures thereof), partly or fully hydrogenated (or hardened) animal oils (beef tallow, sheep tallow, hog fat and others, or mixtures thereof), partly or fully hydrogenated (or hardened) vegetable oils (e.g., palm oil, soybean oil, rapeseed oil, cottonseed oil, castor oil, and others, or mixtures thereof), and mixtures of two or more of the above compounds.

In an embodiment, the controlled release agent is selected from the group consisting of fatty acids, animal oils, vegetable oils and mixtures thereof. The controlled release agent may be a vegetable oil, e.g., selected from palm oil, soybean oil, rapeseed oil, cottonseed oil, and castor oil, preferably soybean oil. The controlled release agent may be a vegetable oil that is at least partially hydrogenated. Alternatively, the controlled release agent may be a vegetable oil that is fully hydrogenated.

In an embodiment, the controlled release agent comprises or essentially consists of fully hydrogenated soybean oil. In another embodiment, the controlled release agent comprises the hydrogenated forms of soybean and palm oil.

In one embodiment, the ratio of the gluconic acid and/or one or more gluconic acid derivatives to the controlled release agent may be in the range of about 20:80 percent by weight to about 65:35 percent by weight. For instance, the ratio of the gluconic acid and/or one or more gluconic acid derivatives to the controlled release agent may be in the range from about 20:80 percent by weight to about 65:35 percent by weight, preferably about 25:75 to about 60:40, preferably about 30:70 to about 55:45, more preferably about 40:60 to about 50:50 percent by weight. In an embodiment, the weight percent ratio of the gluconic acid and/or one or more gluconic acid derivatives to the controlled release agent may be in the range of about 40:60 percent by weight. In another embodiment, the weight percent ratio of the gluconic acid and/or one or more gluconic acid derivatives to the controlled release agent may be in the range of about 50:50 percent by weight.

In one embodiment, the gluconic acid and/or derivatives thereof is embedded in a matrix of the controlled release agent, for instance, in hydrogenated vegetable oil. The composition as taught herein can be in the form of a pill, pellet, granule, and the like. The skilled person is capable of providing a suitable form of the composition taught herein. In an embodiment, the composition as taught herein is capable of at least partially, preferably substantially, bypassing the rumen of ruminants, and is capable of at least partially, preferably substantially, completely releasing the gluconic acid and/or one or more gluconate acid derivatives in the abomasum and lower intestine, particularly the small intestine, of a ruminant.

In another embodiment, the composition as taught herein is capable of at least partially, substantially, preferably substantially, completely bypassing the reticulorumen of ruminants, and is capable of at least partially, substantially, preferably substantially, completely releasing the gluconic acid and/or one or more gluconate acid derivatives in the abomasum and lower intestine, particularly the small intestine, of a ruminant.

In an embodiment, the composition as taught herein is at least partly, substantially, preferably substantially, completely digested and absorbed in the abomasum and lower intestine, particularly the small intestine, of a ruminant.

In an embodiment, the controlled release composition comprising the gluconic acid and/or one or more gluconic acid derivatives and the controlled release agent is combined with gluconic acid and/or one or more gluconic acid derivatives in free form.

Methods and Uses
Method for Increasing Milk Fat Production in a Ruminant

In a further aspect, this disclosure relates to a method for increasing milk fat production in a lactating ruminant comprising the step of administering the composition as taught herein to the ruminant.

When practicing the method of this disclosure, the compositions as taught herein can be administered by any known conventional methods suitable to feed ruminants. For instance, the composition as taught herein may be administered to the ruminant by allowing the ruminant to ingest the composition.

The compositions taught herein may be administered in an amount of about 0.01% to 7.0%, such as about 0.05% to 3.5%, about 0.075% to 1.75%, or about 0.1% to 1.0% of the target dry matter intake.

In an embodiment of the disclosure, the compositions as taught herein are administered to a ruminant in an amount ranging between about 0.01 gram per day to about 1000 grams per day, preferably about 0.1 gram per day to about 700, preferably about 0.25 gram per day to about 750 grams per day, preferably about 0.50 gram per day to about 500 grams per day, preferably about 0.75 gram per day to about 250 grams per day, preferably about 1 gram per day to about 200 grams per day, preferably about 10 grams per day to about 150 grams per day, preferably about 25 grams per day to about 150 grams per day, preferably about 50 grams to about 150 grams per day.

In a preferred embodiment, the compositions as taught herein are administered to a ruminant in an amount of about 150 grams per day.

In another embodiment, the compositions as taught herein may be administered or fed to a ruminant ad libitum, i.e., at liberty, which means that the animal can eat as much as desired without any restrictions on the amount of compositions as taught herein that the animal may eat per day.

In a preferred embodiment, the ruminant feed compositions as taught herein may be administered to a ruminant for a period of at least 4 days.

In an embodiment, the compositions as taught herein may be administered before and/or as soon as a ruminant becomes pregnant. In another embodiment, the composition as taught herein may be administered before and/or during the calving period (i.e., the period of time through which a ruminant gives birth to one or more calves). In yet another embodiment, the composition as taught herein may be administered before and/or during the lactation period following the calving period.

In an embodiment, the composition as taught herein may be administered as soon as a ruminant begins lactation until lactation is complete prior to the cessation of gestation and initiation of the calving process.

In one embodiment, the compositions as taught herein may be a constituent of a ruminant feed composition.

The compositions as taught herein may be administered to a ruminant simultaneously with other conventional ruminant feeds and/or feed supplements (e.g., corn silage, alfalfa silage, mixed hay, and the like) or may be administered separately, i.e., before or after feeding a ruminant with conventional ruminant feeds.

The method to increase milk fat production as taught herein is suitable for any lactating ruminant. For instance, in an embodiment, the method to increase milk fat production as taught herein may be particularly suitable for lactating (dairy) ruminants selected from the group consisting of cows, cattle, sheep, goats, bison, buffalo, moose, elks, giraffes, yaks, deer, camels, antelope, and the like. In a preferred embodiment, the lactating (dairy) ruminant is a lactating (dairy) cow.

Method for Increasing the Production of Butyric Acid and/or One or More Butyric Acid Derivatives in the Lower Intestine of Ruminants In another aspect, this disclosure relates to a method for increasing the production of butyric acid and/or one or more butyric acid derivatives in the abomasum, hindgut and/or lower intestine of a ruminant comprising the step of:

administering the composition as taught herein to the ruminant.

The administration regime may be the same as taught above.

The butyric acid and/or one or more butyric acid derivatives may be butyric acid salts (also referred to as butyrates) or esters.

In an embodiment, the butyric acid salt (or butyrate) is selected from the group of cellulose acetate butyrate, methyl butyrate, ethyl butyrate, butyl butyrate, pentyl butyrate, sodium butyrate.

The method as taught herein may be particularly suitable to increase the energy status and/or improve health of the hindgut, including lower intestine, particularly the small intestine, and/or to boost somatic growth of any ruminants including bovine ruminants in general, for instance, not only cows, bulls, steers, stags, heifers, bred heifers, oxen, calves, cattle, beef cattle, but also sheep, goats, buffalo, moose, elks, giraffes, yaks, deer, camels, antelope, and the like.

Method for Producing the Ruminant Feed Compositions of the Disclosure

In a further aspect, this disclosure relates to a method for producing the compositions as taught herein comprising the steps of:

(a) combining a gluconic acid and/or one or more gluconic acid derivatives as taught herein and a controlled release agent as taught herein.

In an embodiment, the gluconic acid and/or one or more gluconic acid derivatives as taught herein may be admixed with the controlled release agent as taught herein. The gluconic acid and/or one or more gluconic acid derivatives may be embedded in a matrix of the controlled release agent. Alternatively, the gluconic acid and/or one or more gluconic acid derivatives may be surrounded by a coating of the controlled release agent. Any conventional methods known to the skilled person that are suitable for coating or embedding a gluconic acid and/or one or more gluconic acid derivatives may be used. The skilled person is well acquainted with such methods and techniques and can adapt them as needed for coating or embedding any gluconic acid and/or one or more gluconic acid derivatives as taught herein.

For instance, the controlled release agent can be applied to the gluconic acid and/or one or more gluconic acid derivatives as taught herein by spraying the controlled release agent onto particles comprising the gluconic acid and/or one or more gluconic acid derivatives until a desirable level of coating or coverage or desirable thickness is achieved or until the gluconic acid and/or one or more gluconic acid derivatives as taught herein is sufficiently embedded in the controlled release agent, using conventional methods and apparatuses. Alternatively, the gluconic acid and/or one or more gluconic acid derivatives as taught herein can be immersed in the controlled release agent once or repeatedly until a desirable level of coating or coverage or a desirable thickness of coating is achieved or until the gluconic acid and/or one or more gluconic acid derivatives as taught herein is sufficiently embedded, using conventional methods and apparatuses (e.g., pan coating, fluid bed coating, continuous pour coating, and the like).

Alternatively, the gluconic acid and/or gluconic acid derivatives, such as salts or esters thereof, may be admixed with the controlled release agent to become embedded in a matrix thereof. This may require heating of the controlled release agent to fluidity, mixing in the gluconic acid and/or gluconic acid derivatives, and cooling of the resultant to allow the controlled release agent/gluconic acid compound combination to solidify.

Uses of the Compositions Taught Herein

In an embodiment, the compositions as taught herein may be formulated for use as a ruminant feed and/or ruminant feed supplement.

Thus, this disclosure also relates to a ruminant feed and/or ruminant feed supplement comprising the composition taught herein. The composition as taught herein may be combined with commonly used feed or feed supplement ingredients.

In one embodiment, the compositions as taught herein may be suitable for increasing milk fat production in a lactating ruminant. In one embodiment, the compositions and methods as taught herein may be suitable for increasing milk fat production in any lactating ruminant, e.g., selected from cows, cattle, sheep, goats, buffalo, bison, moose, elks, giraffes, yaks, deer, camels, antelope, and the like. In a preferred embodiment, the lactating ruminant may be a lactating dairy cow.

In an embodiment, the composition as taught herein may be used for improving the health of the lower intestine, particularly the small intestine, of a ruminant. In one embodiment, the health status of the lower intestine of any ruminants, males and females, including bovine ruminants in general, for instance, cows, bulls, steers, stags, heifers, bred heifers, oxen, calves, cattle, beef cattle, but also sheep, goats, buffalo, moose, elks, giraffes, yaks, deer, camels, antelope, and the like, may be improved.

In an embodiment, the ruminant may be a lactating ruminant, preferably a lactating dairy cow. In another embodiment, the ruminant may be cattle, preferably beef cattle. In yet another embodiment, the ruminant may be lactating sheep or goats.

The compositions as taught herein may be used for increasing the production of butyric acid and/or one or more butyric acid derivatives, preferably butyric acid, in the lower intestine of a ruminant.

Alternatively or additionally, the compositions as taught herein may be used for increasing somatic growth of a ruminant.

The ruminant may be any ruminant, males and females, including bovine ruminants in general, for instance, cows, bulls, steers, stags, heifers, bred heifers, oxen, calves, cattle, beef cattle, but also sheep, goats, buffalo, moose, elks, giraffes, yaks, deer, camels, antelope, and the like. In a preferred embodiment, the ruminant may be a lactating ruminant, preferably a lactating dairy cow.

This disclosure is further illustrated, but not limited, by the following examples. From the above discussion and these examples, one skilled in the art can ascertain the essential characteristics of this disclosure and, without departing from the teaching and scope thereof, can make various changes and modifications of the disclosure to adapt it to various usages and conditions. Thus, various modifications of the disclosure, in addition to those shown and described herein, will be apparent to those skilled in the art from the foregoing description. Such modifications are also intended to fall within the scope of the appended claims.

EXAMPLES

Example 1: Effects of Post-Ruminal Supply of Calcium Gluconate on Milk Fat Production in Lactating Dairy Cows Justification of Dose Rations were formulated to provide 100% of the net energy for lactation ($NE_L$) and metabolizable protein (MP) requirements for milk and milk component production. Dose of calcium gluconate was calculated as 0.2%, and 0.6% of target dry matter intake (DMI), or 47 and 140 grams per day (g/d), respectively. A similar inclusion rate of 0.2% of DMI was previously used in calf diets supplemented with calcium gluconate.

Materials and Methods

Six rumen-cannulated early-lactation dairy cows (60±6 days in milk (DIM)) were used for this study. Cows were fed a basal diet to provide an estimated $NE_L$ of 6.82 MJ/kg of dry matter (DM) and 16.17% crude protein (CP).

Experimental Design

Six fistulated cows were fed the basal diet ad libitum for at least fourteen days prior to the start of infusions. The intake over the final seven days of this period was averaged and used as the starting point for the level of feeding, which was fixed through the experiment. The experiment was a 6×6 Latin square design where each period consisted of five days of infusion, followed by two days post-treatment rest time (no infusions). This experimental design allowed each cow to receive every treatment, which provided six replicates per treatment. Production data from the final day of each experimental period was analyzed using the MIXED procedure in SAS where the cow was considered a random effect and period and treatment were considered fixed effects. Treatment means were separated by Tukey's test. Differences were considered significant at P≤0.05 and tendencies at 0.05≤P≤0.15 (Doelman et al. (2008), *J Dairy Sci.* 91:3998-4001)).

Treatments

Cows were infused with test treatments into the abomasum via rumen cannula. Placement of the abomasal infusion line was checked routinely. Treatment periods consisted of 120 hours of continuous infusion followed by a 48-hour rest period with no infusion.

As the negative control, the saline treatment infusate was composed of 0.9% (w/v) sodium chloride. The positive control was sodium butyrate at 0.5% of the formulated dry matter intake to provide 135 g/d, or 25% of the estimated total daily butyrate production, equivalent to 65% of the butyrate produced in the lower gut. Treatments consisted of two levels of calcium gluconate at 0.2%, and 0.6% of the formulated dry matter intake, or 47 grams/day and 140 grams/day, respectively. As no data on butyrate synthesis in the lower gut was available in the lactating dairy cow, post ruminal synthesis of 205 grams/day in Holstein steers (Siciliano-Jones and Murphy, 1989) was used to determine the contribution of treatment substrate to total butyrate supply. The two levels of treatment would provide 23.5% and 70% of post ruminal production (or ruminal bypass), respectively. Each treatment was infused at a total volume of 8 L/d and was continuously infused into the abomasum for 120 hours. See Table 1 for all treatment infusate compositions.

Results

Animal Health and Performance

Body weight was maintained to within 3% and was not affected by diet or treatment. All cows remained on trial for the duration and the experiment was completed in six periods. There were no significant differences in dry matter intake (DMI) in response to treatment (Table 1).

TABLE 1

Dry matter intake and milk production responses to dietary provision of two levels of calcium gluconate in lactating dairy cows (n = 6 per treatment).

|  | Saline | 0.5 NB | 0.2 CG | 0.6 CG | SEM | P |
|---|---|---|---|---|---|---|
| DMI (kg/d) | 25.5 | 25.5 | 25.4 | 24.8 | 0.72 | 0.35 |
| Milk (Kg/d) | 46.4 | 47.3 | 47.5 | 44.9 | 2.53 | 0.38 |
| Fat (Kg/d) | $1.76^{ab}$ | $1.88^{ab}$ | $2.09^a$ | $2.00^{ab}$ | 0.16 | 0.04 |
| Protein (Kg/d) | 1.33 | 1.36 | 1.35 | 1.28 | 0.08 | 0.29 |
| Lactose (Kg/d) | 2.23 | 2.28 | 2.29 | 2.15 | 0.12 | 0.25 |
| Fat (%) | $3.87^{ab}$ | $4.01^{bc}$ | $4.41^c$ | $4.40^c$ | 0.16 | 0.01 |
| Protein (%) | 2.87 | 2.89 | 2.87 | 2.86 | 0.11 | 0.54 |
| Lactose (%) | 4.82 | 4.82 | 4.83 | 4.80 | 0.06 | 0.75 |
| Milk urea nitrogen (mg/dl) | 8.2 | 8.5 | 8.8 | 8.2 | 1.07 | 0.42 |
| Feed efficiency (Kg/Kg DM) | 1.82 | 1.85 | 1.87 | 1.81 | 0.09 | 0.89 |
| Energy balance (MJ/d) | 2.9 | 1.7 | −4.7 | −1.7 | 4.93 | 0.29 |

Abbreviations:
DMI = dry matter intake,
Kg/Kg DM = Kg/Kg of dry matter,
NB = Sodium butyrate (positive control),
CG = calcium gluconate, and
MJ/d = megajoule/day.
$^{a-c}$Means in a row with different superscripts are significantly different P ≤ 0.05. Letters are symbols used to differentiate treatment means that are statistically different from each other, i.e., the treatment value denoted with a is significantly different from other treatment values denoted by b or c. Similarly, treatment values denoted by b are significantly different from values denoted by a or c and treatment values denoted by c are significantly different from values denoted by a or b. If a letter is shared between two or more treatment values, they are not significantly different from each other.

Milk and Component Production

Abomasal infusion of calcium gluconate at two levels did not increase milk or protein yield compared to saline or the positive control (Table 1 above). However, total milk fat yield (kg/d) responded positively to supplementation and tended to be higher for 0.2 CG relative to the negative control (P=0.13). Compared to saline, milk fat concentration (percent fat in total milk yield) was significantly higher in response to 0.2 CG (P=0.011) and 0.6 CG (P=0.012).

Example 2: Effects of Oral Administration of a Composition Comprising Calcium Gluconate Admixed with Hydrogenated Palm Oil on Milk Fat Production, Butyrate Production, and Somatic Growth in Lactating Dairy Cows Treatments Treatments were a negative control (no treatment) and 0.07% dry matter intake (DMI: 16 g/d of rumen-protected calcium gluconate containing 6.25 g of calcium gluconate; encapsulate of calcium gluconate in hydrogenated palm oil, ratio of hydrogenated palm oil to calcium gluconate was 60:40 percent by weight). Based on potential rumen degradability of 20%, the proposed feeding amount was predicted to provide 5 g/d of active ingredient.

Materials and Methods

Twenty-five dairy cows were placed on treatment approximately 21 days post-partum until 105 days of lactation. Cows were fed a ration to provide an estimated net energy of lactation ($NE_L$) of 7.47 MJ/kg dry matter (DM) and 17.47% crude protein (CP).

Experimental Design

Dairy cows used on this experiment were kept in tie stalls in the lactating dairy unit at the Trouw Nutrition Agresearch Dairy Research Facility. Cows were fed a basal diet ad libitum for the duration of the experiment beginning immediately post-partum as per current management practice. The experiment was a Latin square design consisting of 28-day periods. Analysis of variance was conducted using the MIXED procedure in SAS.

Results

Animal Health and Performance

Body weight tended to increase (P=0.065) with treatment but body condition was not impacted (Table 2).

Milk and Component Production

Milk fat concentration significantly increased by 0.20% (P=0.041) and milk fat yield tended to increase (P=0.061) 110 g/d in response to 16 g/d of rumen-protected calcium gluconate (Table 2).

TABLE 2

Body weight, condition score and lactation performance of lactating dairy cows consuming rumen-protected calcium gluconate (n = 25).

|  | Control | 16 g/d | P |
|---|---|---|---|
| Body Weight, kg | 685 | 695 | 0.065 |
| Body Condition Score | 2.91 | 2.90 | 0.988 |
| Dry Matter Intake, kg/d | 23.8 | 23.9 | 0.878 |
| Yield, kg/d |  |  |  |
| Milk | 48.0 | 48.0 | 0.670 |
| Fat | 1.72 | 1.83 | 0.061 |
| Protein | 1.34 | 1.35 | 0.739 |
| Lactose | 1.92 | 1.92 | 0.669 |
| Concentration, % |  |  |  |
| Fat | 3.67 | 3.87 | 0.041 |
| Protein | 2.82 | 2.83 | 0.974 |
| Lactose | 4.79 | 4.80 | 0.711 |
| Fat Corrected Yield, kg/d | 49.1 | 51.2 | 0.094 |
| Feed Efficiency, kg/kg | 2.09 | 2.17 | 0.178 |

Fecal SCFA Composition

Fecal concentration of butyrate tended to increase 9% in response to 16 g/d of rumen-protected calcium gluconate (P=0.091; Table 3).

TABLE 3

Fecal SCFA composition response in lactating dairy cows consuming rumen-protected calcium gluconate (n = 25).

|  | Control | 16 g/d | P |
|---|---|---|---|
| Acetic Acid, mmol/g | 0.243 | 0.250 | 0.735 |
| Propionic Acid, mmol/g | 0.086 | 0.091 | 0.494 |
| Butyric Acid, mmol/g | 0.051 | 0.056 | 0.090 |
| Isobutyric Acid, mmol/g | 0.030 | 0.037 | 0.215 |
| Valeric Acid, mmol/g | 0.015 | 0.018 | 0.321 |
| Isovaleric Acid, mmol/g | 0.020 | 0.020 | 0.938 |

Conclusions

This experiment was designed to determine efficacy of rumen-protected calcium gluconate on milk production parameters and fecal short-chain fatty acid (SCFA) composition. These results demonstrate a positive response to dietary provision of 16 g/d of rumen-protected product in terms of milk fat concentration and yield and fecal butyrate concentration.

Example 3: Effects of Oral Administration of a Composition Comprising Calcium Gluconate Admixed with Hydrogenated Palm Oil on Microbial Profile in the Lower Intestine of Lactating Dairy Cows The experiment is conducted as described under Example 1, except the calcium gluconate is encapsulated in hydrogenated palm oil and is administered orally. The results of the experiment show that the two dosages of calcium gluconate (CG) produce changes in the microbiota in the lower intestine of dairy cows receiving the treatment in comparison to dairy cows not receiving the treatment.

The invention claimed is:

1. A controlled release composition, consisting of a gluconic acid and/or one or more salts thereof as the sole active ingredient for increasing milk fat production, admixed in a solid matrix comprising a controlled release agent selected from the group consisting of:
   (i) fatty acids, partially or fully hydrogenated animal oils, partially or fully hydrogenated vegetable oils, and mixtures of two or more ingredients selected from the group consisting of fatty acids, partially or fully hydrogenated animal oils, and partially or fully hydrogenated vegetable oils;
   (ii) liposomes, membranes, hydrogels, acrylic polymers or co-polymers, polysaccharides, vinyl polymers or copolymers, and
   (iii) mixtures of any thereof,
   wherein, if the composition comprises antioxidants, the only antioxidants in the composition are selected from the group consisting of gluconic acid and/or one or more salts thereof, butylated hydroxyanisole, butylated hydroxytoluene, tocopherols, and propyl gallate.

2. The composition of claim 1, wherein the one or more salts of gluconic acid are selected from the group consisting of calcium gluconate, sodium gluconate, quinine gluconate, ferrous gluconate, potassium gluconate, zinc gluconate, copper gluconate, cobalt gluconate, barium gluconate, lithium gluconate, magnesium gluconate and cupric gluconate.

3. The composition of claim 1, wherein the controlled release agent is a vegetable oil that is at least partially hydrogenated.

4. The composition of claim 3, wherein the vegetable oil is selected from the group consisting of palm oil, soybean oil, rape seed oil, cottonseed oil, castor oil, and mixtures thereof.

5. The composition of claim 3, wherein the vegetable oil is soybean oil.

6. The composition of claim 3, wherein the vegetable oil is fully hydrogenated.

7. The composition of claim 1, wherein the weight percent ratio of the gluconic acid and/or one or more salts thereof to the controlled release agent ranges from about 20:80 to about 65:35 percent by weight.

8. The composition of claim 1, wherein the gluconic acid and/or one or more salts thereof is released from the composition post-ruminally in a ruminant.

9. The method according to claim 8, wherein the ruminant is adult.

10. The method according to claim 8, wherein the ruminant is selected from the group consisting of dairy cows, beef cattle, sheep, goats, bison, buffalo, moose, elks, giraffes, yaks, deer, camels, and antelope.

11. A method for improving the health status of the hindgut of a ruminant, the method comprising:
   feeding the ruminant the composition of claim 1.

12. A method for increasing the production of butyrate production in a ruminant's hindgut, the method comprising:
   feeding the ruminant the composition of claim 1.

13. A method for increasing somatic growth of a ruminant, the method comprising:
   feeding the ruminant the composition of claim 1.

14. A method for increasing milk fat production in a lactating ruminant, the method comprising:
 administering to the lactating ruminant the composition of claim 1 so as to increase milk fat production in the lactating ruminant.

15. The method according to claim 14, wherein the composition is administered to the lactating ruminant in an amount ranging from about 0.01 gram per day to about 1000 grams per day.

16. The method according to claim 14, wherein the gluconic acid and/or one or more salts thereof is calcium gluconate.

17. The method according to claim 14, wherein the composition is administered to the lactating ruminant orally.

18. The method according to claim 14, wherein the lactating ruminant is adult.

19. The method according to claim 14, wherein the lactating ruminant is selected from the group consisting of cow, cattle, sheep, goat, bison, buffalo, moose, elk, giraffe, yak, deer, camel, and antelope.

20. The composition of claim 1, wherein the composition has a ruminal bypass fraction of at least 75%.

21. The composition of claim 1, wherein the one or more salts of gluconic acid are selected from the group consisting of calcium gluconate and sodium gluconate.

22. The composition of claim 1, wherein the controlled release agent has an intestinal digestibility fraction in a ruminant of at least 75%.

23. The composition of claim 1, wherein the weight percent ratio of the gluconic acid and/or one or more salts thereof to the controlled release agent is at least about 40:60 percent by weight.

24. The composition of claim 1, wherein the weight percent ratio of the gluconic acid and/or one or more salts thereof to the controlled release agent is 50:50 percent by weight.

25. The composition of claim 1, wherein the gluconic acid and/or one or more salts thereof is released in the abomasum and/or small intestine of a ruminant.

26. The composition of claim 1, which is in the form of a pill, pellet, or granule.

27. The composition of claim 1, further comprising nutritional ingredients selected from the group consisting of grain products, plant products, animal products, proteins, amino acids, enzymes, probiotic microorganisms, prebiotic ingredients, mineral salts, vitamins, sugars and complex carbohydrates, veterinary compounds, and trace elements.

28. The composition according to claim 27, wherein the proteins are obtained from dried blood or meat meal, meat and bone meal, cottonseed meal, soybean meal, rapeseed meal, sunflower seed meal, canola meal, safflower meal, dehydrated alfalfa, corn gluten meal, soybean protein concentrate, potato protein, dried and sterilized animal and poultry manure, fish meal, fish and poultry protein isolates, crab protein concentrate, hydrolyzed protein feather meal, poultry byproduct meal, liquid or powdered egg, milk whey, egg albumen, casein, fish solubles, cell cream, and brewer's residues.

29. The composition according to claim 27, wherein the vitamins are selected from the group consisting of thiamine HCl, riboflavin, pyridoxine HCl, niacin, inositol, choline chloride, calcium pantothenate, biotin, folic acid, ascorbic acid, vitamin B12, p-aminobenzoic acid, vitamin A acetate, vitamin K, vitamin D, and vitamin E.

30. The composition according to claim 27, wherein the veterinary compounds are selected from the group consisting of promazine hydrochloride, chloromedoniate acetate, chlorotetracycline, sulfamethazine, monensin, sodium monensin, poloxaline, oxytetracycline, and BOVATEC.

31. The composition according to claim 27, wherein the complex carbohydrates are selected from the group consisting of water-soluble and water-insoluble monosaccharides, disaccharides, and polysaccharides.

32. The composition according to claim 27, wherein the trace elements are selected from the group consisting of compounds of cobalt, copper, manganese, iron, zinc, tin, nickel, chromium, molybdenum, iodine, chlorine, silicon, vanadium, selenium, calcium, magnesium, sodium and potassium.

33. The composition of claim 1, further comprising other ingredients selected from the group consisting of binding substances, filling substances, inert ingredients, flow-control substances, preservative agents, and antibacterial agents.

34. The composition according to claim 33, wherein the binding substances are selected from the group consisting of cellulose derivatives, vinyl derivatives, gum arabic, guaiac gum, and sodium polyacrylate.

35. The composition according to claim 34, wherein the cellulose derivatives are selected from the group consisting of hydroxypropylcellulose, methyl cellulose, and sodium carboxymethylcellulose.

36. The composition according to claim 34, wherein the vinyl derivatives are selected from the group consisting of polyvinyl alcohol and polyvinylpyrrolidone.

37. The composition according to claim 33, wherein the filling substances are selected from the group consisting of starch, proteins, and crystalline cellulose.

38. The composition according to claim 33, wherein the inert ingredients are selected from the group consisting of silica and silicate compounds.

39. The composition according to claim 33, wherein the flow-control substances are selected from the group consisting of wheat middlings and beet pulp.

40. The composition according to claim 33, wherein the preservative agents are selected from the group consisting of propionic acid or salt thereof, sorbic acid or salt thereof, benzoic acid or salt thereof, dehydroacetic acid or salt thereof, parahydroxybenzoic acid esters, imazalil, thiabendazole, orthophenyl phenol, sodium orthophenylphenol, diphenyl, and mixtures thereof.

* * * * *